US012517447B2

(12) United States Patent
Watanabe

(10) Patent No.: US 12,517,447 B2
(45) Date of Patent: Jan. 6, 2026

(54) IMAGE FORMING APPARATUS CAPABLE OF CORRECTING THE UPPER VALUE OF A DC VOLTAGE USED TO ADJUST A DEVELOPMENT VOLTAGE CONTAINING A DC VOLTAGE

(71) Applicant: KYOCERA Document Solutions Inc., Osaka (JP)

(72) Inventor: Akihiro Watanabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/782,457

(22) Filed: Jul. 24, 2024

(65) Prior Publication Data

US 2025/0044720 A1 Feb. 6, 2025

(30) Foreign Application Priority Data

Aug. 1, 2023 (JP) ................................ 2023-125650

(51) Int. Cl.
*G03G 15/00* (2006.01)
*G03G 15/06* (2006.01)
*G03G 21/18* (2006.01)

(52) U.S. Cl.
CPC ....... *G03G 15/065* (2013.01); *G03G 15/5004* (2013.01); *G03G 15/5033* (2013.01);
(Continued)

(58) Field of Classification Search
CPC ............ G03G 15/065; G03G 15/5004; G03G 2215/0607; G03G 15/5041;
(Continued)

(56) References Cited

U.S. PATENT DOCUMENTS

2004/0131370 A1* 7/2004 Yamauchi .......... G03G 21/1889 399/24
2009/0214240 A1* 8/2009 Hamada ............... G03G 15/065 399/55
(Continued)

FOREIGN PATENT DOCUMENTS

JP 2012-018212 A 1/2012

*Primary Examiner* — Stephanie E Bloss
*Assistant Examiner* — Laura Roth
(74) *Attorney, Agent, or Firm* — Stein IP, LLC

(57) ABSTRACT

An image forming apparatus includes an image forming unit having an image carrier, a charging device, and a development device, so as to perform image formation using toner, an exposure device, an image density sensor, a development voltage power supply, a control unit, and a layer thickness detection mechanism. The control unit can perform calibration, in which density of a reference image formed by the image forming unit is detected by the image density sensor, and the development voltage is adjusted based on a detection result, so as to adjust the density of the toner image. The layer thickness detection mechanism detects thickness of the photosensitive layer. Along with a decrease in the thickness of the photosensitive layer detected by the layer thickness detection mechanism, the control unit stepwisely decreases an upper limit value of the DC voltage from a reference value, when adjusting the development voltage in the calibration.

6 Claims, 6 Drawing Sheets

(52) U.S. Cl.
CPC ..... *G03G 15/5041* (2013.01); *G03G 21/1889* (2013.01); *G03G 2215/00029* (2013.01); *G03G 2215/00071* (2013.01); *G03G 2215/0607* (2013.01); *G03G 2221/1663* (2013.01)

(58) Field of Classification Search
CPC ........... G03G 15/0896; G03G 15/5033; G03G 15/0907; G03G 15/751; G03G 2215/00029; G03G 2215/00071; G03G 2215/0609; G03G 2221/1663; G03G 21/1889
See application file for complete search history.

(56) References Cited

U.S. PATENT DOCUMENTS

| | | | | |
|---|---|---|---|---|
| 2016/0097987 | A1* | 4/2016 | Kikuchi | G03G 15/80 399/50 |
| 2019/0146394 | A1* | 5/2019 | Matsuno | G03G 15/553 399/50 |
| 2020/0103785 | A1* | 4/2020 | Shimizu | G03G 15/065 |
| 2021/0302866 | A1* | 9/2021 | Shimizu | G03G 15/065 |

* cited by examiner

IMAGE FORMING APPARATUS CAPABLE OF CORRECTING THE UPPER VALUE OF A DC VOLTAGE USED TO ADJUST A DEVELOPMENT VOLTAGE CONTAINING A DC VOLTAGE

INCORPORATION BY REFERENCE

This application is based upon and claims the benefit of priority from the corresponding Japanese Patent Application No. 2023-125650 filed Aug. 1, 2023, the entire contents of which are hereby incorporated by reference.

BACKGROUND

The present disclosure relates to an image forming apparatus equipped with an image carrier, such as a copier, a printer, a facsimile machine, or a multifunction peripheral thereof, and in particular to an image forming apparatus equipped with a development device of a two-component development type using two-component developer.

In an image forming apparatus, an electrostatic latent image, which is formed on the image carrier constituted of a photosensitive body or the like, is developed by the development device, so as to visualize the image as a toner image. As one of such development devices, a two-component development type using two-component developer is adopted.

In the image forming apparatus of the two-component development type, development characteristics largely vary depending on thickness of a photosensitive layer of a photosensitive drum. Specifically, as the thickness of the photosensitive layer becomes larger, capacitance of the photosensitive layer becomes larger, and hence the amount of toner that transfers during development is decreased, resulting in deterioration of developability. Therefore, it is necessary to increase a development voltage to be higher as the thickness of the photosensitive layer is larger. However, when the development voltage becomes high, a toner aggregate is apt to transfer to the photosensitive drum during development, and white dots occur on the image. On the other hand, for longer life of the image forming apparatus, it is necessary to use a thick layer photosensitive drum having a certain thickness or more of the photosensitive layer when starting use.

SUMMARY

An image forming apparatus according to one aspect of the present disclosure includes an image forming unit, an exposure device, an image density sensor, a development voltage power supply, a control unit, and a layer thickness detection mechanism. The image forming unit includes an image carrier, a charging device, and a development device, so as to perform image formation using toner. The image carrier has a surface on which a photosensitive layer is formed. The charging device charges the surface of the image carrier. The development device includes a developer carrier that carries developer containing the toner, so as to develop an electrostatic latent image formed on the image carrier into a toner image. The exposure device exposes the surface of the image carrier charged by the charging device, so as to form an electrostatic latent image whose charge is attenuated. The image density sensor detects density of the toner image formed by the image forming unit. The development voltage power supply applies a development voltage, in which an AC voltage is superimposed on a DC voltage, to the developer carrier. The control unit controls the development voltage power supply. The control unit is capable of performing calibration, in which density of a reference image formed by the image forming unit is detected by the image density sensor, and the development voltage is adjusted on the basis of a detection result, so as to adjust the density of the toner image. The layer thickness detection mechanism detects thickness of the photosensitive layer. Along with a decrease in the thickness of the photosensitive layer detected by the layer thickness detection mechanism, the control unit stepwisely decreases an upper limit value of the DC voltage from a reference value, when adjusting the development voltage in the calibration.

DETAILED DESCRIPTION

Figure 1:
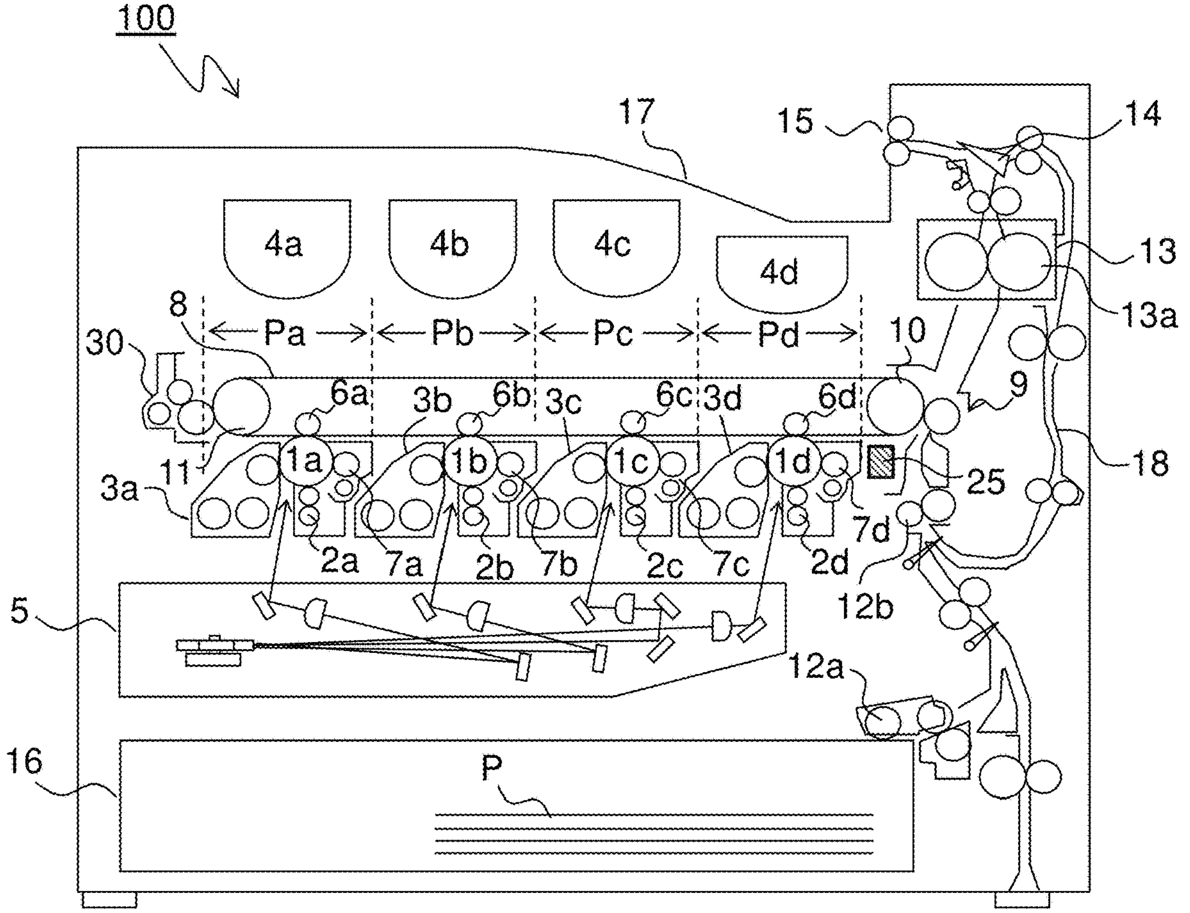
FIG. 1 is a schematic structural diagram of a color printer according to one embodiment of the present disclosure.
Figure 2:
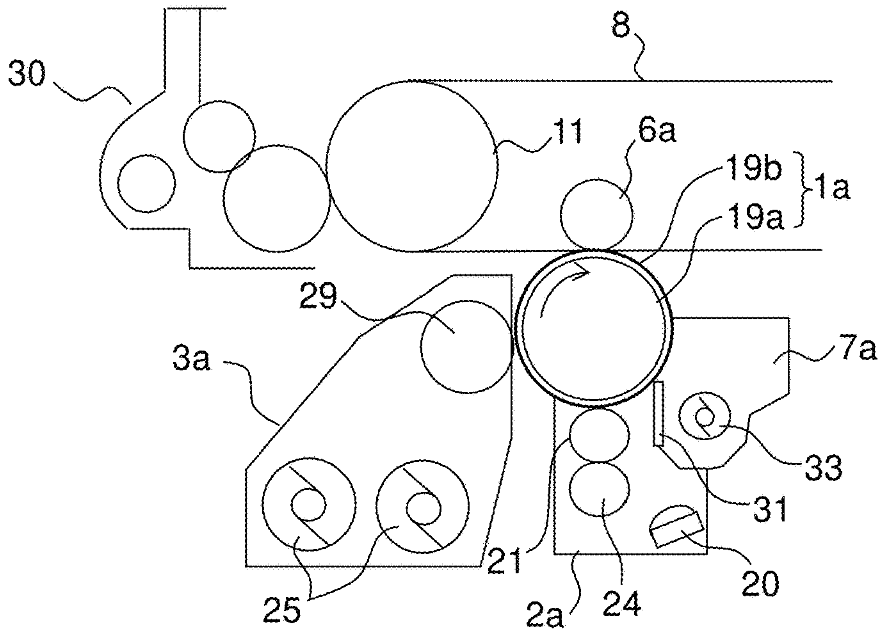
FIG. 2 is an enlarged view of an image forming unit and its vicinity in FIG. 1.

Hereinafter, with reference to the drawings, an embodiment of the present disclosure is described. FIG. 1 is a schematic cross-sectional view of a color printer 100 according to one embodiment of the present disclosure. FIG. 2 is an enlarged view of an image forming unit Pa and its vicinity in FIG. 1. Note that image forming units Pb to Pd have the same basic structure as the image forming unit Pa, and descriptions thereof are omitted.

In a main body of the color printer 100, the four image forming units Pa, Pb, Pc, and Pd are arranged in this order from an upstream side in a conveying direction (the left side in FIG. 1). These image forming units Pa to Pd are disposed corresponding to four different color images (yellow, magenta, cyan, and black images), and they form yellow, magenta, cyan, and black images, respectively and sequentially, by charging, exposing, developing, and transferring steps.

These image forming units Pa to Pd are equipped with photosensitive drums 1*a*, 1*b*, 1*c*, and 1*d*, respectively, which each carry a visual image (toner image) of each color. Further, an intermediate transfer belt 8 is disposed adjacent to the image forming units Pa to Pd, so as to rotate in a counterclockwise direction in FIG. 1. An intermediate transfer belt 8 is wrapped around a drive roller 10 on a downstream side and a tension roller 11 on the upstream side. On the upstream side of the image forming unit Pa in a rotation direction of the intermediate transfer belt 8, a belt cleaning device 30 is disposed to face the tension roller 11 via the intermediate transfer belt 8.

As illustrated in FIG. 2, around the photosensitive drum la, along a drum rotation direction (a clockwise direction in FIG. 2), a charging device 2*a*, a development device 3*a*, a cleaning device 7*a*, and a charge elimination device 20 are arranged, and a primary transfer roller 6*a* is disposed via the intermediate transfer belt 8.

The photosensitive drums 1*a* to 1*d* are each constituted of a conductive base 19*a* and a photosensitive layer 19*b* formed on a surface of the conductive base 19*a*. In this embodiment, on a surface of the aluminum cylindrical conductive base 19*a*, a single layer of organic photosensitive layer is formed as the photosensitive layer 19*b*.

The charging devices 2*a* to 2*d* each include a charging roller 21 that contacts the photosensitive drums 1*a* to 1*d*, respectively, so as to apply a charging voltage (a DC voltage plus an AC voltage) to the drum surface, and a charging cleaning roller 24 that cleans the charging roller 21.

The development devices 3*a* to 3*d* are each a two-component developing type including two stirring conveying screws 25 and a developing roller 29, and are filled with predetermined amounts of two-component developer respectively containing cyan, magenta, yellow, and black color toner and magnetic carrier. A magnetic brush is formed using the two-component developer on a surface of the developing roller 29, and the developing roller 29 is applied with a development voltage having the same polarity as the toner (e.g., a positive polarity). In this state, the magnetic brush contacts a surface of the photosensitive drum 1*a* so that the toner can adhere, and the toner image is formed. Note that, if a ratio of the toner in the two-component developer filled in the development device 3*a* to 3*d* is decreased lower than a specified value due to toner image formation, the toner is replenished from a toner container 4*a* to 4*d* to the development device 3*a* to 3*d*.

The cleaning devices 7*a* to 7*d* each include a cleaning blade 31 and a collecting screw 33. The cleaning blade 31 removes toner and the like remaining on the surface of the photosensitive drum 1*a* to 1*d*. The collecting screw 33 discharges toner and the like removed by the cleaning blade 31 to the outside of the cleaning device 7*a* to 7*d*, so as to collect the same into a waste toner collecting container (not shown). The charge elimination device 20 emits charge elimination light to the surface of the photosensitive drum 1*a* to 1*d* so as to eliminate residual charge.

Figure 4:
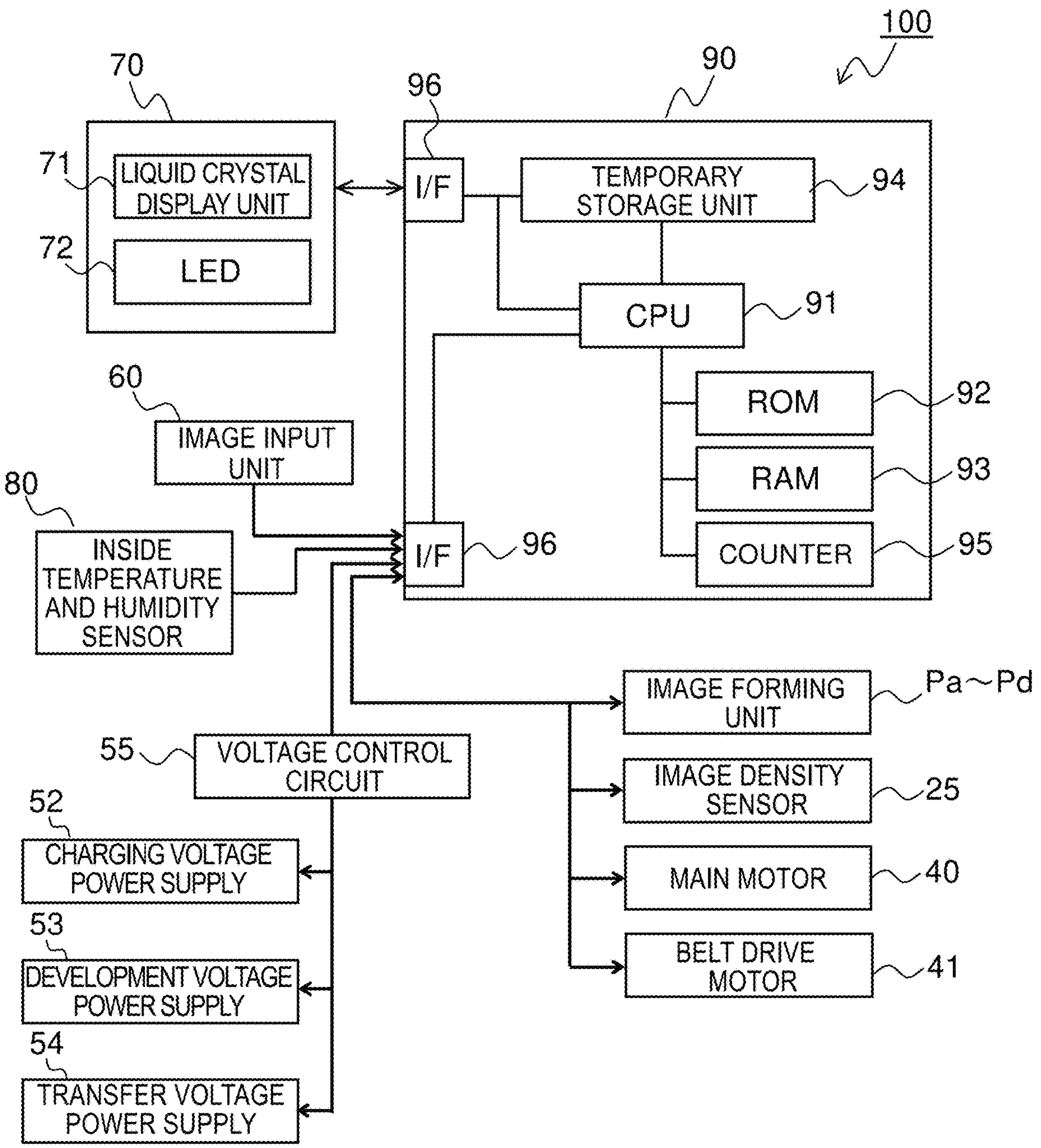
FIG. 4 is a block diagram illustrating one example of control paths used in the color printer.

When image data is input from a host device such as a personal computer, rotation of the photosensitive drums 1*a* to 1*d* is started first by a main motor 40 (see FIG. 4). In addition, a belt drive motor 41 (see FIG. 4) starts to drive the intermediate transfer belt 8 to rotate. Next, the charging devices 2*a* to 2*d* uniformly charge the surfaces of the photosensitive drums 1*a* to 1*d*, respectively, at the same polarity as the toner (e.g., the positive polarity). Next, an exposure device 5 emits light beams according to the image data, so as to form electrostatic latent images whose charges are attenuated according to the image data, on the photosensitive drums 1*a* to 1*d*, respectively.

The development devices 3*a* to 3*d* are filled with two-component developer (hereinafter, also simply referred to as developer) containing yellow, magenta, cyan, and black color toners by predetermined amounts from the toner containers 4*a* to 4*d*, respectively. The development device

3*a* to 3*d* supplies the toner in the developer to the photosensitive drum 1*a* to 1*d*, and the toner adheres to the same in an electrostatic manner. In this way, the toner image is formed according to the electrostatic latent image formed by the exposure by the exposure device 5.

Further, the primary transfer roller 6*a* to 6*d* applies an electric field with a predetermined transferring voltage between the primary transfer roller 6*a* to 6*d* and the photosensitive drum 1*a* to 1*d*, and the yellow, magenta, cyan, and black toner images on the photosensitive drums 1*a* to 1*d* are primarily transferred onto the intermediate transfer belt 8. The toner and the like remaining on the surfaces of the photosensitive drums 1*a* to 1*d* after the primary transfer are removed by the cleaning devices 7*a* to 7*d*, respectively. The residual charges remaining on the surfaces of the photosensitive drums 1*a* to 1*d* after the primary transfer are eliminated by the charge elimination devices 20.

A paper sheet P, to which the toner image is transferred, is stored in a paper sheet cassette 16 disposed in a lower part of the color printer 100. The paper sheet P is conveyed by a sheet feed roller 12*a* and a registration roller pair 12*b* at a predetermined timing, to a nip part (a secondary transfer nip part) between the intermediate transfer belt 8 and a secondary transfer roller 9 disposed adjacent to the intermediate transfer belt 8. The paper sheet P with the toner image after secondary transfer is conveyed to a fixing unit 13.

The paper sheet P conveyed to the fixing unit 13 is heated and pressed by a fixing roller pair 13*a* so that the toner image is fixed to a surface of the paper sheet P, and a predetermined full color image is formed. The paper sheet P with the full color image formed is discharged by a discharge roller pair 15 onto a discharge tray 17 as it is (or after being sent to a reverse conveying path 18 by a branch unit 14 and after images are formed on both sides).

An image density sensor 25 is disposed at a position facing the drive roller 10 via the intermediate transfer belt 8. As the image density sensor 25, an optical sensor is usually used, which includes a light emitting element constituted of an LED or the like and a light receiving element constituted of a photodiode or the like. When measuring toner adhesion amount on the intermediate transfer belt 8, the light emitting element emits measurement light to patch images (a reference image) formed on the intermediate transfer belt 8, and the measurement light enters the light receiving element as light reflected by the toner and light reflected by the belt surface.

The reflected light from the toner and from the belt surface includes specular reflection light and diffused reflection light. The specular reflection light and the diffused reflection light are separated from each other by a polarized light separation prism, and enter different light receiving elements, respectively. Each light receiving element performs photoelectric conversion of the received specular reflection light or diffused reflection light and outputs an output signal to a control unit 90 (see FIG. 4).

Further, on the basis of change in characteristics of the output signal of the specular reflection light and the diffused reflection light, image density (toner amount) and image position of the patch images are detected, and are compared with predetermined reference density and reference position, respectively, so as to adjust a characteristic value of the development voltage, exposure start position and timing of the exposure device 5, and the like. Thus, image density correction and color shift correction (calibration) are performed for each color.

Figure 3:
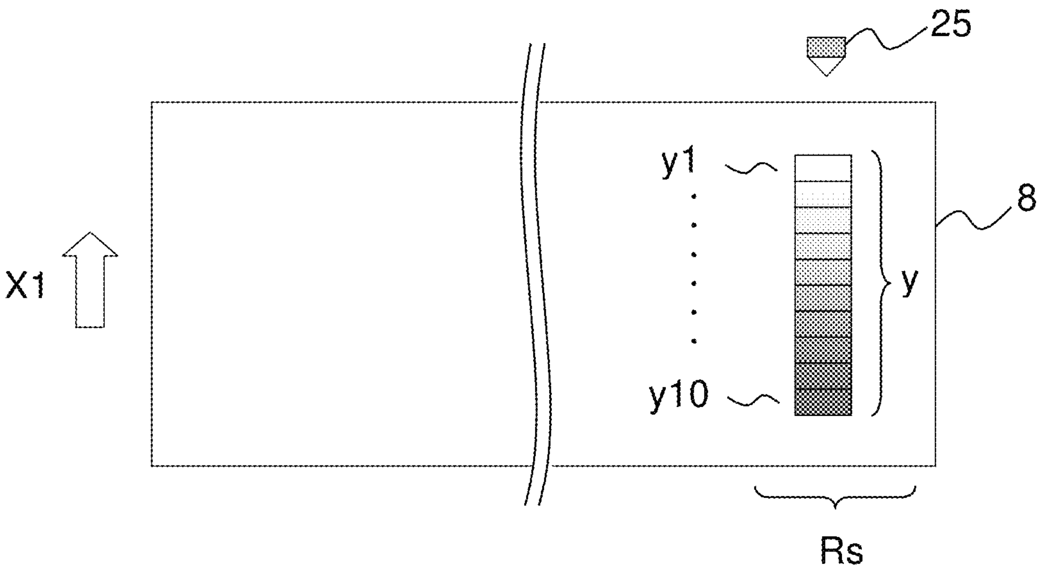
FIG. 3 is a diagram illustrating one example of patch images (a reference image) for correcting image density.

FIG. 3 is a diagram illustrating one example of the patch images (the reference image) for correcting image density.

In a reference image formation region Rs on one side (the right side) in a width direction of the intermediate transfer belt 8, a reference image y, i.e., patch images y1 to y10 having densities in ten steps, from a lightest color image y1 to a darkest color image y10, are formed in a row from the downstream side along a belt moving direction (arrow X1 direction). Neighboring patch images are each formed in a single color so that the density changes at the boundary between them. Note that a yellow reference image y is exemplified in this description, but the same is true for cyan, magenta, and black reference images c, m, and k.

The toner adhesion amount (toner density) of the reference image y to k is detected by the image density sensor 25 and is compared with a predetermined standard density, and hence an average value of density difference between each toner density and the standard density is calculated. In accordance with the obtained average value of density difference, a parameter value that is used for density correction is determined as described later, and the density correction is performed for each color.

FIG. 4 is a block diagram illustrating one example of control paths used in the color printer 100. Note that various controls of individual units of the color printer 100 are performed when using the color printer 100, and hence the control paths of the entire color printer 100 are complicated. Therefore, a part of the control paths that is necessary for implementing the present disclosure is mainly described.

A charging voltage power supply 52 applies the charging voltage to the charging roller 21 in the charging device 2*a* to 2*d*. A development voltage power supply 53 applies the development voltage, in which an AC voltage Vac is superimposed on a DC voltage Vdc, to the developing roller 29 in the development device 3*a* to 3*d*. A transfer voltage power supply 54 applies a predetermined primary transfer voltage and a predetermined secondary transfer voltage to the primary transfer roller 6*a* to 6*d* and the secondary transfer roller 9, respectively. A voltage control circuit 55 is connected to the charging voltage power supply 52, the development voltage power supply 53, and the transfer voltage power supply 54, and controls these power supplies to operate, on the basis of an output signal from the control unit 90.

An image input unit 60 is a reception unit that receives image data sent from a personal computer or the like to the color printer 100. The image signal input by the image input unit 60 is converted into a digital signal, which is sent to a temporary storage unit 94.

An operation unit 70 is equipped with a liquid crystal display unit 71 and an LED 72. The liquid crystal display unit 71 displays an operational state of the color printer 100, an image formation status, the number of copies to be printed, and the like. The LED 72 displays various states, errors, and the like of the color printer 100. Various settings of the color printer 100 are performed via a printer driver on the personal computer.

Other than that, the operation unit 70 is equipped with a start button for a user to instruct to start the image formation, a stop/clear button that is used when canceling the image formation, a reset button that is used when resetting various setting of the color printer 100 to a default state, and the like.

An inside temperature and humidity sensor 80 detects temperature and humidity inside the color printer 100, in particular temperature and humidity in a vicinity of the image forming units Pa to Pd, and it is disposed in a vicinity of the image forming units Pa to Pd.

The control unit 90 includes at least a central processing unit (CPU) 91, a read only memory (ROM) 92 that is a storage unit dedicated to reading, a random access memory (RAM) 93 that is a readable and writable storage unit, the temporary storage unit 94 that temporarily stores the image data and the like, a counter 95, and a plurality of (e.g., two) interfaces (I/Fs) 96 for transmitting control signals to individual devices in the color printer 100 and receiving an input signal from the operation unit 70. The control unit 90 can be disposed at any position inside the main body of the color printer 100.

The ROM 92 stores data and the like that is not changed during use of the color printer 100, such as a control program for the color printer 100, numerical values necessary for control, and the like. The RAM 93 stores data generated during control of the color printer 100, data that is temporarily necessary for controlling the color printer 100, and the like.

In addition, the RAM 93 (or the ROM 92) also stores relationship between a layer thickness of the photosensitive layer 19*b* and a DC voltage Vdc, when changing an upper limit value of the DC voltage Vdc of the development voltage applied to the developing roller 29 of the development device 3*a* to 3*d*, on the basis of absolute humidity and the layer thickness of the photosensitive layer 19*b* of the photosensitive drum 1*a* to 1*d*, and relationship (arithmetic equation) between an accumulated operation distance and the layer thickness of the photosensitive layer 19*b*, when calculating the layer thickness of the photosensitive layer 19*b* on the basis of the accumulated operation distance of the photosensitive drum 1*a* to 1*d*, as described later. The temporary storage unit 94 temporarily stores the image signal that is input by the image input unit 60 and is converted into the digital signal. The counter 95 accumulates and counts the number of printed sheets.

In addition, the control unit 90 sends control signals to individual parts and devices of the color printer 100 from the CPU 91 via the I/F 96. In addition, the individual parts and devices each send a signal indicating its state or an input signal to the CPU 91 via the I/F 96. The individual parts and devices controlled by the control unit 90 include, for example, the image forming units Pa to Pd, the exposure device 5, the intermediate transfer belt 8, the secondary transfer roller 9, the fixing unit 13, the voltage control circuit 55, the image input unit 60, the operation unit 70, the inside temperature and humidity sensor 80, and the like.

For longer life of the color printer 100, it is necessary to use the photosensitive drums 1*a* to 1*d* having a certain layer thickness or more (e.g., 32 μm or more) of the photosensitive layer 19*b* when starting use. On the other hand, in the development device 3*a* to 3*d* of the two-component development type, development characteristics largely vary depending on the layer thickness of the photosensitive layer 19*b* of the photosensitive drum 1*a* to 1*d*.

Figure 5:
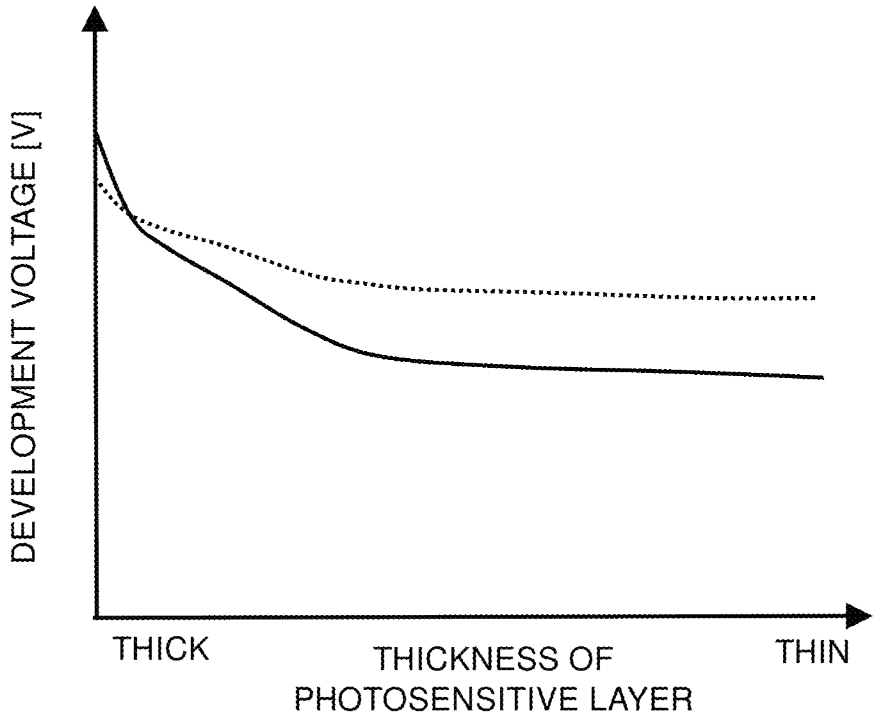
FIG. 5 is a graph illustrating relationship between a thickness of a photosensitive layer of a photosensitive drum and an appropriate DC voltage of a development voltage determined by calibration.

FIG. 5 is a graph illustrating relationship between the layer thickness of the photosensitive layer 19*b* of the photosensitive drum 1*a* to 1*d* and an appropriate development voltage (the DC voltage Vdc) determined by the calibration. Note that the layer thickness of the photosensitive layer 19*b* is largest when starting use of the photosensitive drum 1*a* to 1*d*, and it becomes thinner as durable printing proceeds. Therefore, in FIG. 5 and in FIGS. 6 and 7 that will be referred to later, the origin of the horizontal axis is time when starting use, and the thickness decreases as being apart from the origin.

As described above, capacitance of the photosensitive layer 19*b* becomes larger as the layer thickness of the photosensitive layer 19*b* becomes larger, and hence toner transfer amount from the developing roller 29 to the photosensitive drum 1*a* to 1*d* is decreased, and developability is deteriorated. Therefore, as illustrated in FIG. 5, the DC voltage Vdc (a solid line in FIG. 5) necessary for maintaining appropriate image density is higher as the layer thickness of the photosensitive layer 19*b* is larger.

However, when the DC voltage Vdc becomes high, white dots occur on the image. This is because a toner aggregate is apt to transfer from the developing roller 29 to the photosensitive drum 1*a* to 1*d* during development. Dot lines in FIG. 5 and in FIGS. 6 and 7 that will be referred to later each indicate a DC voltage at which white dots occur (a white dot occurrence voltage). In other words, when the DC voltage Vdc reaches the dot line or higher, white dots occur on the image.

Therefore, in the color printer 100 of this embodiment, an upper limit value is set for the DC voltage Vdc of the development voltage determined by the calibration. Further, if the layer thickness of the photosensitive layer 19*b* of the photosensitive drum 1*a* to 1*d* is more than or equal to a predetermined value set in advance, the upper limit value of the DC voltage Vdc is made lower as the layer thickness of the photosensitive layer 19*b* is thinner.

In addition, the DC voltage Vdc necessary for maintaining appropriate image density (an appropriate value of the DC voltage Vdc) varies depending on absolute humidity (ambient moisture). More specifically, the appropriate value of the DC voltage Vdc increases in a low humidity environment, while it decreases in a high humidity environment.

Figure 6:
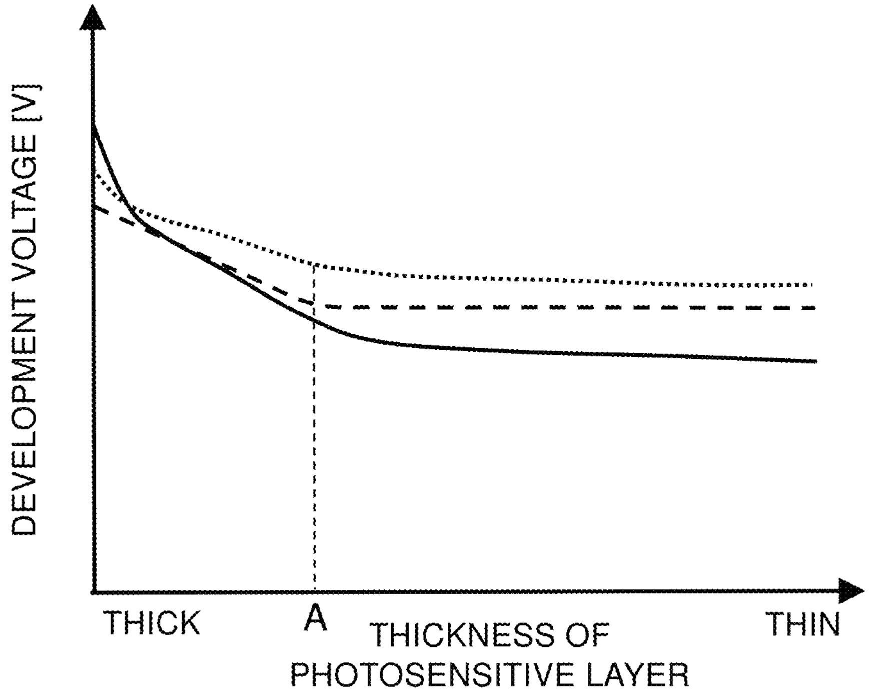
FIG. 6 is a graph illustrating relationship between the thickness of the photosensitive layer of the photosensitive drum and an upper limit value of the DC voltage of the development voltage, and is a diagram illustrating a case where absolute humidity is low.
Figure 7:
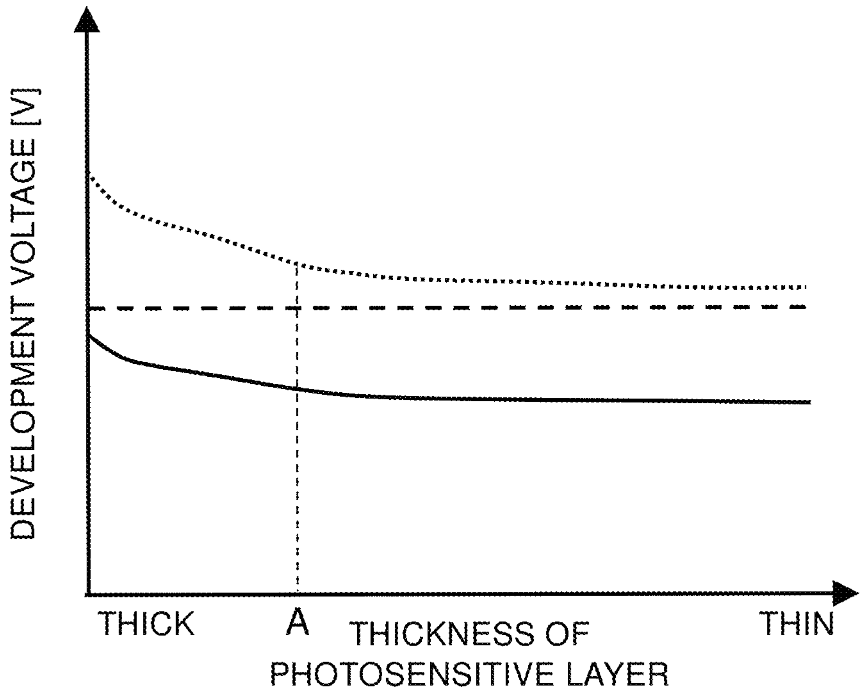
FIG. 7 is a graph illustrating relationship between the thickness of the photosensitive layer of the photosensitive drum and the upper limit value of the DC voltage of the development voltage, and is a diagram illustrating a case where absolute humidity is high.

FIGS. 6 and 7 are each a graph illustrating relationship between the layer thickness of the photosensitive layer 19*b* of the photosensitive drum 1*a* to 1*d* and the upper limit value of the DC voltage Vdc of the development voltage, and are diagrams respectively illustrating a case where the absolute humidity (ambient moisture) is low and a case where the same is high. Broken lines in FIGS. 6 and 7 each indicate the upper limit value of the DC voltage Vdc. The upper limit value of the DC voltage Vdc is set lower than the white dot occurrence voltage (the dot line).

If the absolute humidity is low (e.g., lower than 18 $mg/m^3$), as illustrated in FIG. 6, in the region where the layer thickness of the photosensitive layer 19*b* is larger than a predetermined value A, there occurs a case where the appropriate value of the DC voltage Vdc (the solid line) is higher than the white dot occurrence voltage (the dot line). Therefore, in the region where the layer thickness of the photosensitive layer 19*b* is larger than the predetermined value A, the upper limit value of the DC voltage Vdc (the broken line) is controlled to be smaller as the layer thickness of the photosensitive layer 19*b* is smaller.

In addition, In the region where the layer thickness of the photosensitive layer 19*b* is smaller than the predetermined value A, the appropriate value of the DC voltage Vdc (the solid line) is always lower than the white dot occurrence voltage (the dot line). Therefore, the upper limit value of the DC voltage Vdc (the broken line) is set to a constant value so that the appropriate value of the DC voltage Vdc is not set lower than necessary.

Note that in the region where the layer thickness of the photosensitive layer 19*b* is larger than the predetermined value A, the upper limit value of the DC voltage Vdc (the broken line) may be set lower than the appropriate value of the DC voltage Vdc (the solid line), and hence image density may be lowered a little. However, as occurrence of white dots on the image is suppressed, the image can be a state without a problem (without image noise).

If the absolute humidity is high (e.g., 18 $mg/m^3$ or higher), as illustrated in FIG. 7, the appropriate value of the DC voltage Vdc is lower than the white dot occurrence voltage, regardless of the layer thickness of the photosensitive layer 19*b*. Therefore, without changing the upper limit value of the DC voltage Vdc according to the layer thickness of the photosensitive layer 19*b*, no white dots occur, and appropriate image density can be obtained. In other words, there is no problem with the control of setting the upper limit value of the DC voltage Vdc to a constant value.

Figure 8:
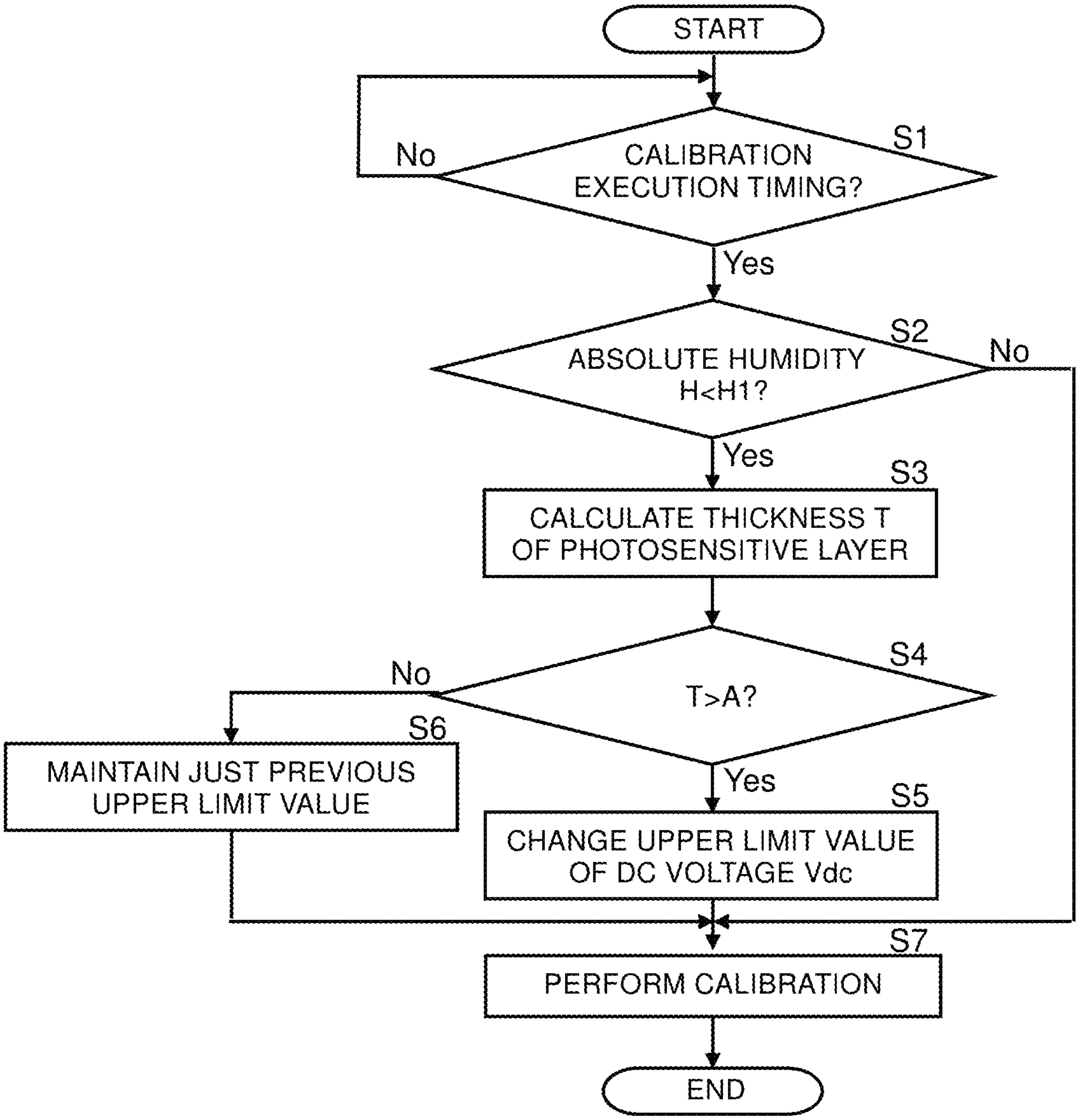
FIG. 8 is a flowchart illustrating an example of a control for setting the upper limit value of the DC voltage in a case where the calibration is performed in the color printer.

FIG. 8 is a flowchart illustrating a control example for setting the upper limit value of the DC voltage Vdc when the color printer 100 performs the calibration. With reference to FIGS. 1 to 7 as necessary, a procedure of setting the upper limit value of the DC voltage Vdc is described along the steps illustrated in FIG. 8.

First, the control unit 90 determines whether or not execution timing of the calibration has come (Step S1). The calibration is executed when the color printer 100 is powered on, or when the accumulated number of printed sheets from the last calibration has reached a predetermined number, or when installation environment (temperature and humidity) has been changed by a certain degree or more, or the like.

If the execution timing of the calibration has come (Yes in Step S1), the control unit 90 determines whether or not absolute humidity H is less than a predetermined value H1 (e.g., 18 $mg/m^3$), on the basis of a detection result of the inside temperature and humidity sensor 80 (see FIG. 4) (Step S2).

If $H<H1$ holds (Yes in Step S2), the control unit 90 calculates layer thickness T of the photosensitive layer 19*b* of the photosensitive drum 1*a* to 1*d* (Step S3). Specifically, the layer thickness T of the photosensitive layer 19*b* is calculated, on the basis of the accumulated operation distance of the photosensitive drum 1*a* to 1*d* from start of use, and relationship between the accumulated operation distance and the layer thickness of the photosensitive layer 19*b* stored in the RAM 93 (or the ROM 92).

Next, the control unit 90 determines whether or not the layer thickness T of the photosensitive layer 19*b* calculated in Step S3 is larger than the predetermined value A (Step S4). If $T>A$ holds (Yes in Step S4), the upper limit value of the DC voltage Vdc of the development voltage is changed on the basis of the layer thickness T of the photosensitive layer 19*b* calculated in Step S3 (Step S5). More specifically, the upper limit value of the DC voltage Vdc is stepwisely decreased from a reference value, along with a decrease in the layer thickness T of the photosensitive layer 19*b*.

On the other hand, if $T \leq A$ holds in Step S4 (No in Step S4), the layer thickness T of the photosensitive layer 19*b* is sufficiently small, and the appropriate value of the DC voltage Vdc (the solid line in FIG. 6) is lower than the white dot occurrence voltage (the dot line in FIG. 6). Therefore, the upper limit value of the DC voltage Vdc that is set in just previous calibration is maintained (Step S6).

After that, the control unit 90 performs the calibration (Step S7). Specifically, the reference image y to k is formed in the reference image formation region Rs of the intermediate transfer belt 8 (see FIG. 3) while stepwisely changing the development voltage (the DC voltage Vdc), and the image density sensor 25 reads the same. The control unit 90 sets the DC voltage Vdc within the range up to the upper limit value set in Steps S5 and S6, on the basis of a detection voltage of the image density sensor 25, or based on linear interpolation of the detection voltages.

Note that in the calibration, besides the setting of the development voltage described above, determination of the exposure amount by the exposure device 5 and correction of a lookup table indicating gamma characteristics for each color are also performed as necessary.

On the other hand, if H≥H1 holds in Step S2 (No in Step S2), calculation of the layer thickness T of the photosensitive layer 19*b* is not performed and the upper limit value of the DC voltage Vdc is not changed, so as to perform the calibration by setting the upper limit value of the DC voltage Vdc to the reference value regardless of the layer thickness of the photosensitive layer 19*b* (Step S7).

According to the control example illustrated in FIG. 8, the upper limit value set for the DC voltage Vdc of the development voltage is changed on the basis of the layer thickness of the photosensitive layer 19*b*. In this way, the appropriate upper limit value is set corresponding to the layer thickness of the photosensitive layer 19*b*, and hence the appropriate DC voltage Vdc is determined within the range that does not exceed the upper limit value when the calibration is performed. Therefore, also in the case where the photosensitive drums 1*a* to 1*d* having a large layer thickness of the photosensitive layer 19*b* are used for longer life, occurrence of white dots can be suppressed while maintaining appropriate image density as much as possible.

In addition, if the layer thickness of the photosensitive layer 19*b* becomes a predetermined value or less, the upper limit value set in the just previous calibration is maintained. In this way, the DC voltage Vdc is not set lower than necessary, and hence the image density can be maintained as much as possible.

In addition, if the absolute humidity is a predetermined value or higher, the appropriate value of the DC voltage Vdc is lower than the white dot occurrence voltage regardless of the layer thickness of the photosensitive layer 19*b*, and hence the upper limit value of the DC voltage Vdc is not changed from the reference value. In this way, the DC voltage Vdc is not set lower than necessary in a high humidity environment where no white dots can occur, and hence sufficient image density can be maintained.

In addition, by calculating the layer thickness of the photosensitive layer 19*b* on the basis of the accumulated operation distance of the photosensitive drum 1*a* to 1*d*, the layer thickness of the photosensitive layer 19*b* can be calculated easily and accurately, and the upper limit value of the DC voltage Vdc can be set more appropriately.

Note that in the example illustrated in FIG. 8, the control unit 90 calculates the layer thickness of the photosensitive layer 19*b* on the basis of the accumulated operation distance (the control unit 90 also works as a layer thickness detection mechanism). However, it may be possible to dispose the layer thickness detection mechanism that calculates the layer thickness of the photosensitive layer 19*b*, separately from the control unit 90.

Other than that, the present disclosure is not limited to the embodiment described above, but can be variously modified within the scope of the present disclosure without deviating from the spirit thereof. For instance, in the embodiment described above, the color printer 100 of an intermediate transfer type is described, in which the toner images formed on the photosensitive drums 1*a* to 1*d* are primarily transferred onto the intermediate transfer belt 8, and are further secondarily transferred onto the paper sheet P. However, this is not a limitation, and the present disclosure can also be applied to a color printer of a direct transfer type, in which the toner images formed on the photosensitive drums 1*a* to 1*d* are directly transferred onto the paper sheet P.

In addition, the embodiment described above exemplifies the color printer 100 including the photosensitive drums 1*a* to 1*d*, each of which has a single layer of organic photosensitive layer as the photosensitive layer 19*b*, and the development devices 3*a* to 3*d* of the two-component development type using two-component developer, but the present disclosure is not limited to this. For instance, the present disclosure can be applied also to an image forming apparatus including the photosensitive drum having a laminated organic photosensitive layer or an amorphous silicon photosensitive layer, and the development device of a one-component development type that uses one-component magnetic developer containing only magnetic toner, or one-component non-magnetic developer containing only non-magnetic toner, so that occurrence of white dots due to a toner aggregate can be suppressed, and that image density can be maintained as much as possible.

In addition, the embodiment described above exemplifies the tandem type color printer 100 as the image forming apparatus, but of course the present disclosure can also be applied other image forming apparatuses such as a color copier, a color multifunction peripheral, a monochrome printer, a monochrome multifunction peripheral, and the like.

The present disclosure can be applied to an image forming apparatus including a two-component development type development device. By applying the present disclosure, it is possible to provide an image forming apparatus that can always determine an appropriate development voltage, regardless of thickness of a photosensitive layer of an image carrier, so as to suppress occurrence of white dots on an image.

What is claimed is:

1. An image forming apparatus comprising:

an image forming unit configured to perform image formation using toner, the image forming unit including
- an image carrier having a surface on which a photosensitive layer is formed,
- a charging device configured to charge the surface of the image carrier, and
- a development device including a developer carrier configured to carry developer containing the toner, so as to develop an electrostatic latent image formed on the image carrier into a toner image;

an exposure device configured to expose the surface of the image carrier charged by the charging device, so as to form the electrostatic latent image whose charge is attenuated;

an image density sensor configured to detect density of the toner image formed by the image forming unit;

a development voltage power supply configured to apply a development voltage, in which an AC voltage is superimposed on a DC voltage, to the developer carrier; and a control unit configured to control the development voltage power supply, the control unit being capable of performing calibration, in which density of a plurality of reference images formed by the image forming unit while varying the DC voltage is detected by the image density sensor, and the development voltage is adjusted on the basis of a detection result, so as to adjust the density of the toner image, wherein the image forming apparatus further comprises a layer thickness detection mechanism configured to detect thickness of the photosensitive layer based on an accumulated operation distance of the image carrier, and along with a decrease in the thickness of the photosensitive layer detected by the layer thickness detection mechanism, the control unit stepwisely decreases an upper limit value of the DC voltage from a reference value to adjust the DC voltage within a range up to the upper limit value, when adjusting the development voltage in the calibration.

2. The image forming apparatus according to claim 1, wherein when the thickness of the photosensitive layer detected by the layer thickness detection mechanism becomes a predetermined value or smaller, the control unit maintains the upper limit value of the DC voltage at the upper limit value set in the just previous calibration.

3. The image forming apparatus according to claim 1, further comprising a humidity detection device configured to detect absolute humidity around the development device, wherein if the absolute humidity detected by the humidity detection device is a predetermined value or higher, the control unit maintains the upper limit value of the DC voltage at the reference value regardless of the thickness of the photosensitive layer.

4. The image forming apparatus according to claim 1, wherein the thickness of the photosensitive layer is 32 μm or more when starting use of the image carrier.

5. The image forming apparatus according to claim 1, wherein the photosensitive layer is a single layer of organic photosensitive layer.

6. The image forming apparatus according to claim 1, wherein the development device is a two-component development type configured to use two-component developer containing the toner and carrier, as the developer.

* * * * *